(12) United States Patent
Miura et al.

(10) Patent No.: US 11,255,867 B2
(45) Date of Patent: Feb. 22, 2022

(54) HOLDER CONVEYING DEVICE

(71) Applicant: Hitachi, Ltd., Tokyo (JP)

(72) Inventors: Yutaka Miura, Tokyo (JP); Yuichi Takanami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 117 days.

(21) Appl. No.: 16/637,379

(22) PCT Filed: Nov. 8, 2018

(86) PCT No.: PCT/JP2018/041536
§ 371 (c)(1),
(2) Date: Feb. 7, 2020

(87) PCT Pub. No.: WO2019/116796
PCT Pub. Date: Jun. 20, 2019

(65) Prior Publication Data
US 2021/0364539 A1  Nov. 25, 2021

(30) Foreign Application Priority Data

Dec. 12, 2017  (JP) ............................. JP2017-237709

(51) Int. Cl.
*G01N 35/04* (2006.01)

(52) U.S. Cl.
CPC ..... *G01N 35/04* (2013.01); *G01N 2035/0406* (2013.01); *G01N 2035/047* (2013.01); *G01N 2035/0477* (2013.01)

(58) Field of Classification Search
CPC ........... G01N 35/04; G01N 2035/0406; G01N 2035/047; G01N 2035/0477
See application file for complete search history.

(56) References Cited

U.S. PATENT DOCUMENTS

| 5,941,366 A | 8/1999 | Quinlan et al. |
| 2005/0207937 A1 | 9/2005 | Itoh |
| | (Continued) | |

FOREIGN PATENT DOCUMENTS

| JP | 2000-146988 A | 5/2000 |
| JP | 2005-263478 A | 9/2005 |
| | (Continued) | |

OTHER PUBLICATIONS

International Preliminary Report on Patentability including Written Opinion of the International Searching Authority, dated Jun. 25, 2020, for International Application No. PCT/JP2018/041536.

(Continued)

*Primary Examiner* — Jennifer Wecker
*Assistant Examiner* — Jonathan Bortoli
(74) *Attorney, Agent, or Firm* — Baker Botts L.L.P.

(57) ABSTRACT

A movable piece includes a front arm and a rear arm. In a first process, the front arm retreats from a conveying path to permit forward movement of an n-th holder, and in a second process advances into the conveying path to restrict forward movement of an n+1-th holder. In the first process, the rear arm advances into the conveying path to restrict forward movement of the n-th holder, and in the second process retreats from the conveying path 18 to permit forward movement of the n-th holder. Midway through the second process, the n-th holder 84 is positioned in a reference stopping position.

8 Claims, 16 Drawing Sheets

(56) References Cited

U.S. PATENT DOCUMENTS

| | | |
|---|---|---|
| 2010/0303331 A1 | 12/2010 | Itoh |
| 2014/0326082 A1 | 11/2014 | Hirama et al. |
| 2016/0039615 A1* | 2/2016 | Otts .................. B65G 47/71 198/368 |
| 2018/0106820 A1 | 4/2018 | Okabe et al. |

FOREIGN PATENT DOCUMENTS

| | | |
|---|---|---|
| JP | 2010-281604 A | 12/2010 |
| JP | 2011-075355 A | 4/2011 |
| JP | 2013-083538 A | 5/2013 |
| JP | 2017-529292 A | 10/2017 |
| WO | WO 2016/158122 A1 | 10/2016 |

OTHER PUBLICATIONS

International Search Report, dated Feb. 12, 2019, which issued during the prosecution of International Application No. PCT/JP2018/041536, which corresponds to the present application.

\* cited by examiner

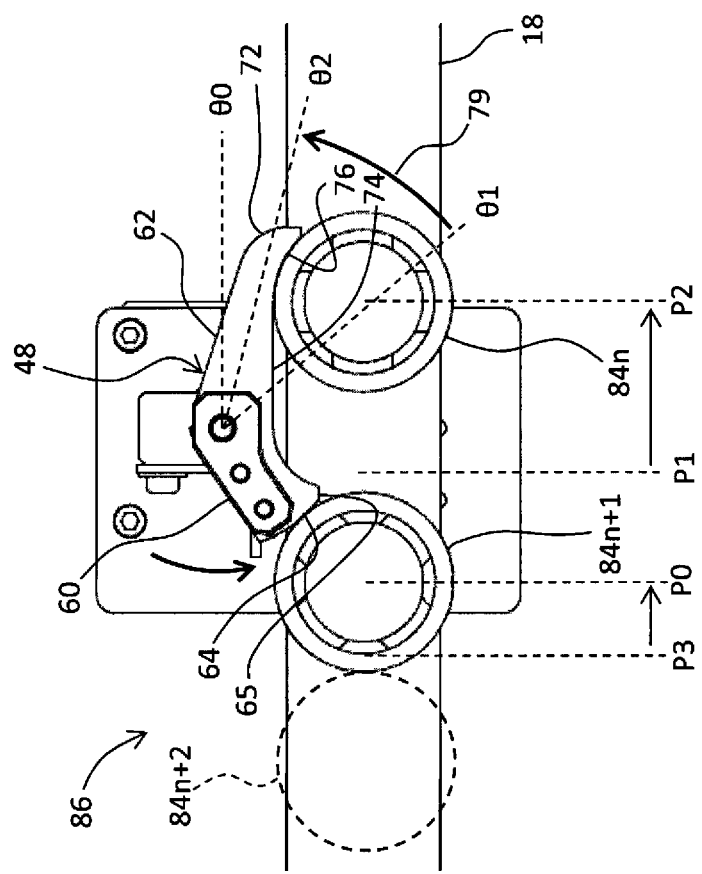

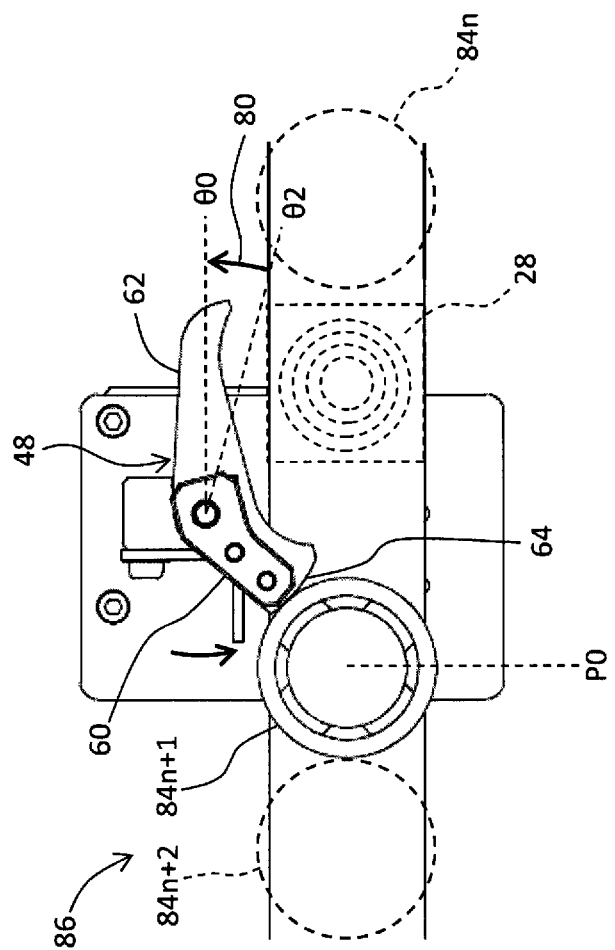

FIG. 10

| Angle and Posture (90) | Front Arm (92) | Rear Arm (94) | Other Operations (96) |
|---|---|---|---|
| S10  θ0 FIRST POSTURE | RESTRICT FORWARD MOVEMENT OF NTH HOLDER | (FULL RETREAT) | |
| S12  FORWARD ROTATION | ALLOW FORWARD MOVEMENT OF NTH HOLDER | ADVANCE ABOVE CONVEYING PATH AND RESTRICT FORWARD MOVEMENT OF NTH HOLDER AT TEMPORARY STOP POSITION | |
| S14  θ1 SECOND POSTURE | | | |
| S16  REVERSE ROTATION | ENTER BETWEEN NTH HOLDER AND N+1TH HOLDER AND SEPARATE THEM | PARTIALLY RETREAT TO RESTRICT FORWARD MOVEMENT OF NTH HOLDER AT REFERENCE STOP POSITION | COMMUNICATION |
| S18  θ2 INTERMEDIATE POSTURE | RESTRICT FORWARD MOVEMENT OF N+1TH HOLDER | | |
| S20  REVERSE ROTATION | | FULLY RETREAT FROM ABOVE CONVEYING PATH TO ALLOW FORWARD MOVEMENT OF NTH HOLDER | |

$n \leftarrow n+1$

HOLDER CONVEYING DEVICE

TECHNICAL FIELD

The present invention relates to a holder conveying apparatus, and in particular to a mechanism that conveys holders holding sample containers.

BACKGROUND

A sample container is a container containing a sample, such as blood or urine. The concept of sample container encompasses a blood collection tube, and the concept also encompasses a parent sample container and a child sample container. To convey sample containers individually, holders functioning as carriers are used (see Patent Documents 1 and 2). A holder is a member for conveying a sample container while holding it. During the process of conveying the sample container, basically, an upright posture of the sample container is maintained. Usually, one holder holds and conveys one sample container.

A holder conveying apparatus is an apparatus that conveys a plurality of holders. The plurality of holders to be conveyed include a holder before holding a sample container and a holder holding a sample container. The holder conveying apparatus can determine destinations of the holders on a per holder basis. The holder conveying apparatus is incorporated into, for example, a sample processor.

CITATION LIST

Patent Literature

Patent Document 1: JP 2011-75355 A
Patent Document 2: JP 2013-83538 A

SUMMARY

Technical Problem

Depending on circumstances, the holder conveying apparatus may need to separate a leading holder from a row of holders. For example, when information is written into an RFID tag (Radio Frequency IDentification tag) built in the holder, and information is read therefrom, the leading holder is separated from the subsequent holders and then positioned directly above or in front of a communication device, in order to limit a communication target or to increase the communication efficiency. The leading holder may also be separated for destination control, reading of a barcode, and other purposes. It is desired to realize the separation of the leading holder by a simple mechanism.

Patent Document 1 discloses, as a mechanism for separating the leading holder, two fan-shaped rotating plates that are attached to a horizontal shaft and rotate. Patent Document 2 discloses, as a mechanism for separating the leading holder, a cylindrical rotating member that houses the entire holder holding a sample container.

An object of the present invention is to realize separation of a leading holder by a simple mechanism in a holder conveying apparatus.

Solution to Problem

A holder conveying apparatus disclosed in the present application includes a conveying path that applies a forward-moving force to a plurality of holders conveying a plurality of sample containers individually, and a separation mechanism that has a movable member rotating about a vertical rotational shaft set in the vicinity of the conveying path. Rotation of the movable member in one direction realizes a first posture of the movable member, and rotation of the movable member in the other direction realizes a second posture of the movable member. The movable member includes a front arm that, in a first process of changing from the first posture to the second posture, retreats from above the conveying path to allow forward movement of an nth holder, and, in a second process of changing from the second posture to the first posture, advances above the conveying path to restrict the forward movement of an n+1th holder, and a rear arm that is an arm provided on the downstream side of the front arm, and in the first process, advances above the conveying path to restrict forward movement of the nth holder and, in the second process, retreats from above the conveying path to allow forward movement of the nth holder.

BRIEF DESCRIPTION OF DRAWINGS

FIG. 8 is a view illustrating an intermediate posture (positioning posture) of the movable piece.

FIG. 9 is a view illustrating the movable piece returned to the first posture (original posture).

FIG. 10 is a diagram for describing actions of a front arm and a rear arm in the first example of the separation mechanism.

DESCRIPTION OF EMBODIMENTS

Hereinafter, an embodiment will be described with reference to the drawings.

(1) Sample Processing System

Figure 1:
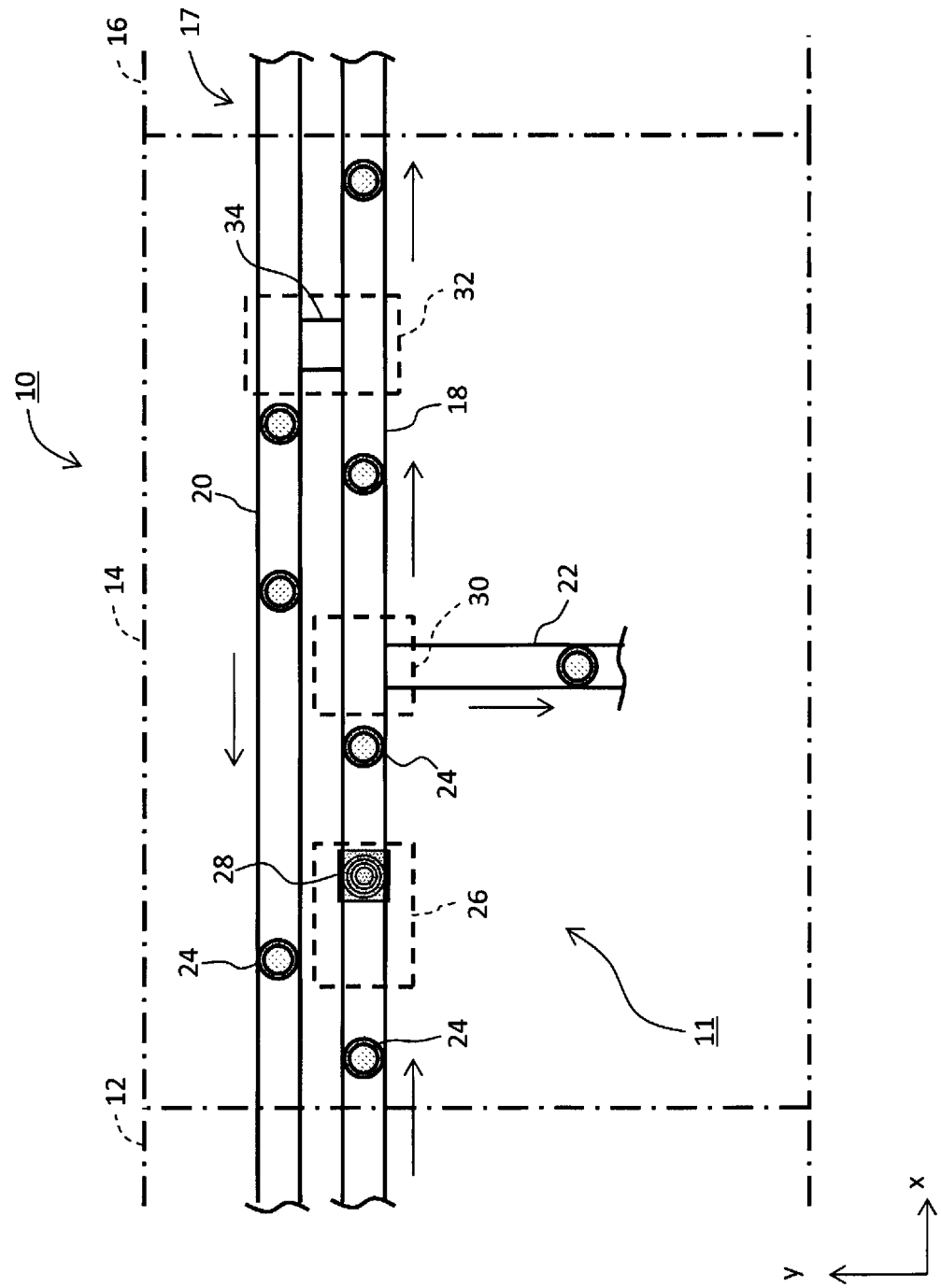
FIG. 1 is a conceptual diagram of an example configuration of a holder conveying apparatus according to an embodiment.

FIG. 1 illustrates an example configuration of a sample processing system 10 provided with a holder conveying apparatus 11 according to the embodiment. The sample processing system 10 performs preprocessing on a sample before the sample is analyzed. The sample includes blood, urine, or the like collected from a living body. The preprocessing includes, for example, centrifugal separation, uncapping, dispensing, and capping. The sample processing system 10 may also analyze the sample.

The sample processing system 10 includes a plurality of units 12, 14, and 16 connected in the X direction. In the illustrated example, these units 12, 14, and 16 perform different processing operations. The units 12, 14, and 16 may, as a matter of course, perform the same processing operation in parallel. The x direction is the first horizontal direction, and the y direction is the second horizontal direction. The z direction that is orthogonal to them is the vertical direction.

The holder conveying apparatus 11 is provided across the plurality of units 12, 14, and 16. The holder conveying apparatus 11 is an apparatus for conveying a plurality of holders 24. The plurality of holders 24 include holders holding sample containers and empty holders before holding sample containers. Each holder 24 has a function of holding one sample container and conveying it. Each holder 24 may have its own designated destination. To control the conveyance of the holders 24, each holder 24 has a built-in RFID tag described below.

The holder conveying apparatus 11 has conveying paths 18, 20, and 22. The conveying path 18 is a main conveying path for conveying the holders 24 from the left side to the right side in FIG. 1. The conveying path 20 is a sub-conveying path as a return conveying path and conveys the holders 24 from the right side to the left side in FIG. 1. Both of the conveying paths 18 and 20 extend parallel to the x direction. The conveying path 22 is a branch conveying path connected to a branch point of the conveying path 18. The conveying path 22 conveys the holders 24 from the upper side to the lower side in FIG. 1, and is parallel to the y direction. The conveying paths 18, 20, and 22 constitute a belt conveyor mechanism 17. The actual form of each of the conveying paths 18, 20, and 22 is a belt that rotates at a constant speed. The belt applies a forward-moving force to each of the holders 24 at all times. If forward movement of a holder is restricted by a stopper or the like, the holder is in a slipping state on the belt. The forward-moving force may also be applied to the holders 24 by a magnetic force or the like.

The holder conveying apparatus 11 has a separation mechanism 26 provided in a separation section, a branching mechanism 30 provided in a branching section, and a transport mechanism 32 provided in a transport section. The separation mechanism 26 is provided with a communication device 28 that performs communication with the RFID tag. In the present embodiment, the communication device 28 reads, in front of the branch point, ID information and the like from the RFID tag included in a particular holder which is in a separated state, or writes ID information and the like into the RFID tag. Other communication media may be used in place of the RFID tag. Reading of a barcode and other operations may be performed in the separation section. In that case, communication may or may not be performed.

The transport mechanism 32 has a relay pedestal 34 provided between the two conveying paths 18 and 20. In FIG. 1, the mechanisms 26, 30, and 32 are represented abstractly, and specific contents of the mechanisms 26, 30, and 32 will be described in detail below.

(2) First Example of Separation Mechanism

Figure 2:
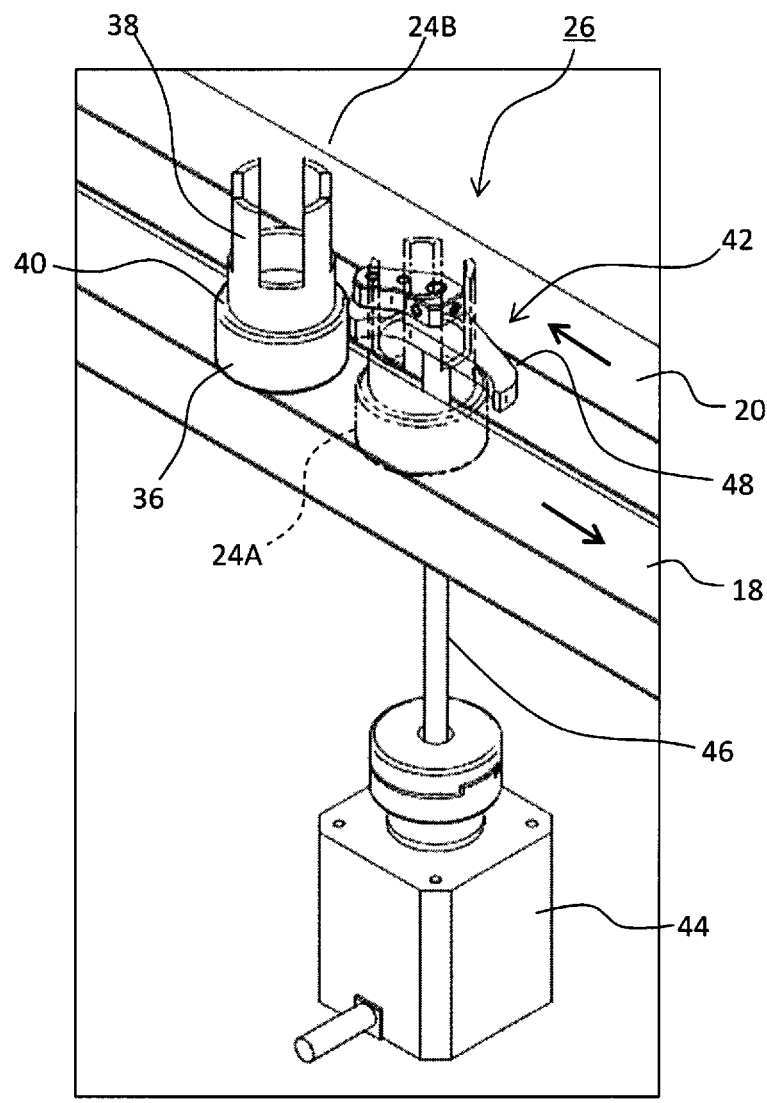
FIG. 2 is a perspective view illustrating a first example of a separation mechanism.

FIG. 2 is a perspective view illustrating a first example of the separation mechanism. The illustrated separation mechanism 26 has a separator 42, a motor 44 serving as a drive source, and a shaft member 46. The separator 42 is provided at a position slightly higher than the level of top surfaces of the conveying paths 18 and 20. The motor 44 is provided below the conveying paths 18 and 20 (underground space). The shaft member 46 is a vertical shaft provided in the vicinity of the conveying path 18; specifically, it passes through a gap between the conveying path 18 and the conveying path 20 along the vertical direction. A rotational force generated in the motor 44 is transmitted to the separator 42 via the shaft member 46.

The separator 42 has a movable piece 48 as a movable member. The movable piece 48 rotates about a rotational shaft in the horizontal direction. In the embodiment, the rotational shaft is composed of an upper end portion of the shaft member 46. Specifically, the movable piece 48 is fixed to the upper end portion of the shaft member 46 by means of a mounting metal fixture. When the shaft member 46 rotates, the movable piece 48 rotates accordingly. The movable piece 48 is made of resin, metal, or other materials.

In FIG. 2, two holders 24A and 24B which are being handled by the separation mechanism 26 are illustrated. These holders have the same structure. Referring now to the holder 24B, the holder 24B has a disk-shaped lower portion 36 and a generally cylindrical retainer 38 which corresponds to an upper portion. The retainer 38 elastically holds a sample container inserted therein. The retainer 38 has four fingers, for example. The fingers maintain a vertical posture (upright posture) of the sample container. It is also possible to add an additional mechanism that, if the vertical posture is changed to an inclined posture, returns the inclined posture to the vertical posture.

The lower portion 36 houses, for example, an RFID tag and a disk-shaped weight therein. The diameter of the lower portion 36 is slightly larger than that of the retainer 38, and the lower portion 36 is thicker than the retainer 38. The lower portion 36 has a shoulder portion 40 on its upper end.

Figure 3:
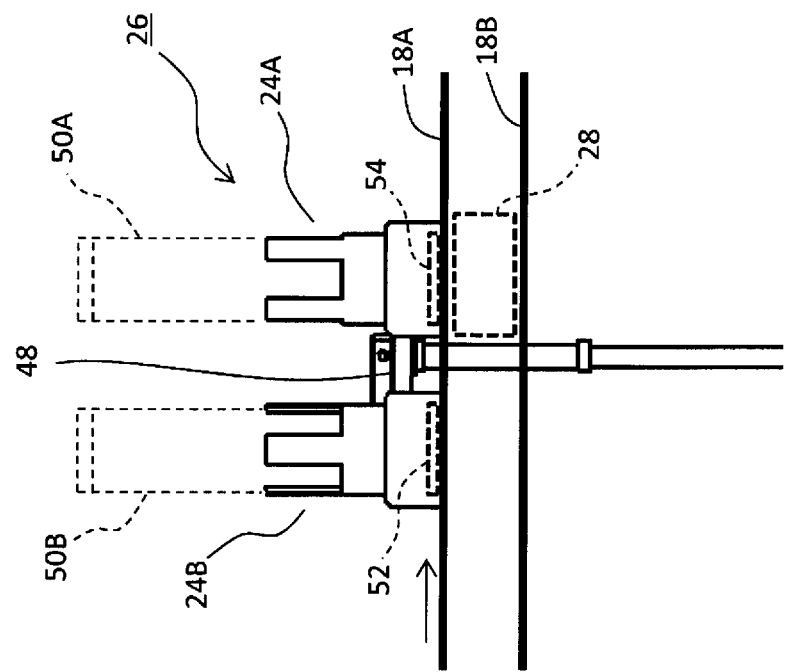
FIG. 3 is a side view illustrating the first example of the separation mechanism.

FIG. 3 illustrates a side surface of the separation mechanism 26. The holders 24A and 24B hold sample containers 50A and 50B, respectively. The movable piece 48 is abutted against the lower portion (specifically, the upper end portion thereof) of each of the holders 24A and 24B. The movable piece 48 may be abutted against the retainer of each of the holders 24A and 24B. The holders 24A and 24B have RFID tags 52 and 54 in their lower portions. The RFID tags 52 and 54 are electronic circuits each having a memory, a transmitter-receiver circuit, an antenna, and the like, and are operated by power obtained from received radio waves to communicate with the communication device in a non-contact manner. Active RFID tags may be used in place of passive RFID tags. The RFID tag may be referred to as, for example, an RF tag, wireless tag, ID tag, or electronic tag according to circumstances.

The circulating belt is composed of an upper belt 18A and a lower belt 18B, and of them, the upper belt 18A constitutes the conveying path. The communication device 28 is provided in the vicinity of a communication position (a reference stop position described below). Specifically, the communication device 28 is located directly under the holder 24A stopped at the communication position, and between the upper belt 18A and the lower belt 18B. The communication device 28 may be provided, on a side of the holder 24A, at a position relatively close to the holder 24A. In either case, the communication device 28 is provided within the area where reliable communication can be performed with the holder 24A stopped at the communication position and no unnecessary communication with other holders is generated.

In FIG. 3, the holder 24A is separated from the subsequent holder 24B; that is, there is a space between them. When the holder 24A is in this separated state, the communication device 28 communicates with the RFID tag 54 located inside the lower portion of the holder 24A. As such, communication can be performed while the holder 24A which is a communication target is isolated, and therefore, it is possible to obtain the advantages of, for example, enabling communication targets for the communication device 28 to be limited (for example, misrecognition and jamming can be prevented) and the communication efficiency to be increased (for example, establishment of communication with a plurality of RFID tags and the resulting prolonged communication time can be prevented). In addition, the communication device 28 is located in a gap between the upper belt 18A and the lower belt 18B, and therefore, it is possible to obtain the advantages of, for example, enabling effective use of dead space and easy positioning, in close proximity with each other, the communication device 28 and the RFID tag 54, which is a communication partner. After the holder 24A, which is a communication target, is separated from the row of holders, the movable piece 48 controls forward movement of the holder 24A such that the holder 24A temporarily stops at the communication position.

The time required for writing information into the RFID tag is, for example, one second, and the time required for reading information from the RFID tag is, for example, 0.3 seconds. These numerical values are mere examples. The RFID tag may be configured to enable faster communication.

Figure 4:
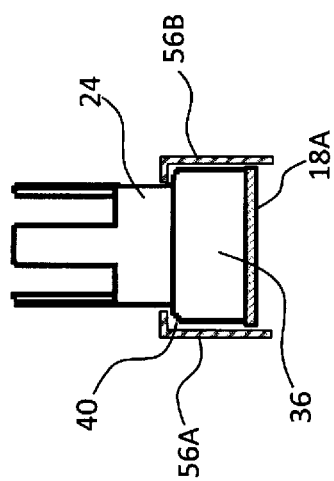
FIG. 4 is a view illustrating a guide mechanism.

FIG. 4 illustrates a guide mechanism. The holder 24 is placed on the upper belt 18A constituting the conveying path, and as the upper belt 18A moves forward, the holder 24 moves forward along with it. At this time, two guide rails 56A and 56B hold the lower portion 36 from its respective sides. In other words, the two guide rails 56A and 56B guide forward movement of the holder 24; specifically, they prevent the holder 24 from dropping off from the upper belt 18A and also prevent it from tumbling. Each of the guide rails 56A and 56B has a folded shape that wraps around the shoulder portion 40. In addition, the movable member, which is to come in contact with the holder, advances above the upper belt 18A through an opening, a notch, or the like formed in the guide rail 56A or 56B. The guide mechanism illustrated in FIG. 4 is an example, and the individual holders 24 may be guided by other mechanisms.

Figure 5:
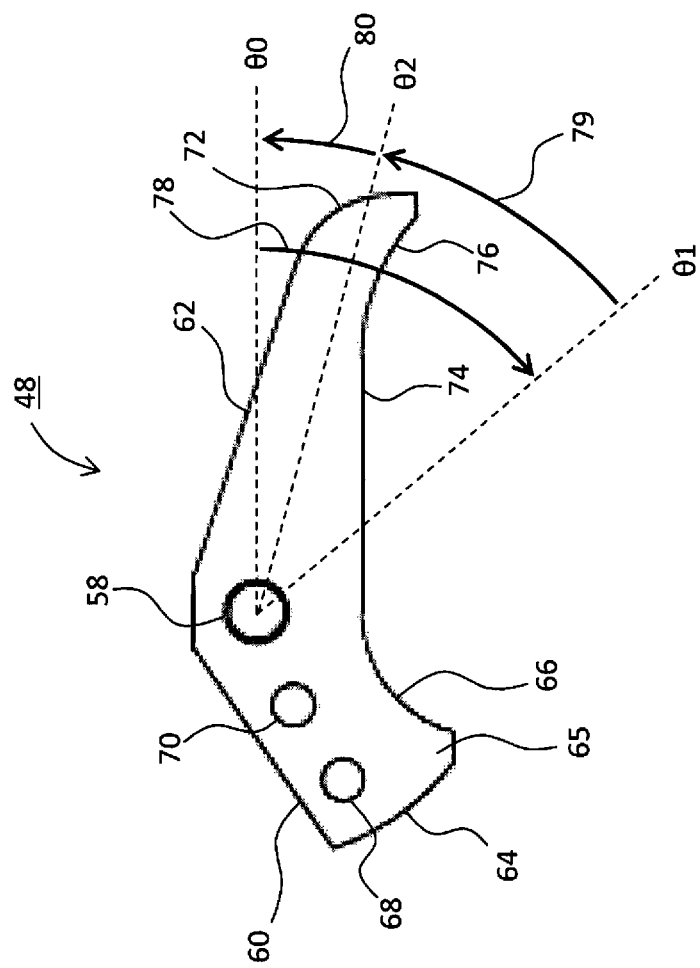
FIG. 5 is a view illustrating one example of a movable piece.

FIG. 5 illustrates the movable piece 48. The movable piece 48 is a plate-like member made of metal, resin, or the like. It has a thickness of several mm, for example. The movable piece 48 rotates about a vertical rotational shaft 58 in the horizontal direction. The movable piece 48 has a front arm 60 that acts on the upstream side and a rear arm 62 that acts on the downstream side. In the illustrated example, compared to the distance from the rotational shaft 58 to the farthest end of the front arm 60, the distance from the rotational shaft 58 to the farthest end of the rear arm 62 is longer. The angle formed by a reference axis of the front arm and a reference axis of the rear arm is not smaller than 90 degrees and not greater than 180 degrees. For example, the angle is within the range between 120 and 150 degrees.

The front arm 60 has a rounded protruding stopper edge 64; namely, an arc-shaped stopper edge 64. Its radius of curvature is constant when viewed from the center of rotation. A protruding portion 65 is formed adjacent to the stopper edge 64. When viewed from the stopper edge 64, an arc-shaped recess 66 is formed on the opposite side beyond the protruding portion 65. For the front arm 60, only the stopper edge 64 actually comes in contact with the holder. Accordingly, the shapes of other portions have a degree of freedom as long as they do not disturb the function of the stopper edge 64. Through holes 68 and 70 are tapped holes to which metal fixtures for mounting the movable piece 48 to the shaft member are fixed. The rotational shaft 58 is composed of the upper end portion of the shaft member as described above.

The rear arm 62 has a linear guide edge 74 extending from the front arm side and a hook 76 connected thereto. An end portion 72 of the rear arm 62 has a J shape, and an edge inside the shape is the hook 76 having a warped shape. For the rear arm 62, the guide edge 74 and the hook 76 contact the holder. Accordingly, the shapes of other portions have a degree of freedom as long as they do not disturb the functions of the guide edge 74 and the hook 76.

In the first example of the separation mechanism, the movable piece 48 roughly takes three postures. That is, it takes a first posture (original posture), a second posture (receiving posture), and an intermediate posture (positioning posture). When the longitudinal direction (axial direction) of the rear arm 62 is used as a reference, in the first posture, the angle of the longitudinal direction is θ0; in the second posture, the angle of the longitudinal direction is θ1; and in the intermediate posture, the angle of the longitudinal direction is θ2.

The first posture is generated when the movable piece 48 rotates to the maximum extent in the counterclockwise direction. The second posture is generated when the movable piece 48 rotates to the maximum extent in the clockwise direction. A process of changing from the first posture to the second posture is a first process (refer to reference numeral 78), and a process of changing from the second posture to the first posture is a second process (refer to reference numerals 79 and 80). The intermediate posture is generated in the middle of the second process. The movable piece 48 then further rotates, and the first posture is generated. The second process is composed of a first partial process from the second posture to the intermediate posture (refer to the reference numeral 79) and a second partial process from the intermediate posture to the first posture (refer to the reference numeral 80). The movable piece 48 is controlled to rotate in the forward and reverse directions such that the first posture, the second posture, and the intermediate posture are realized in a cyclic manner.

Figure 6:
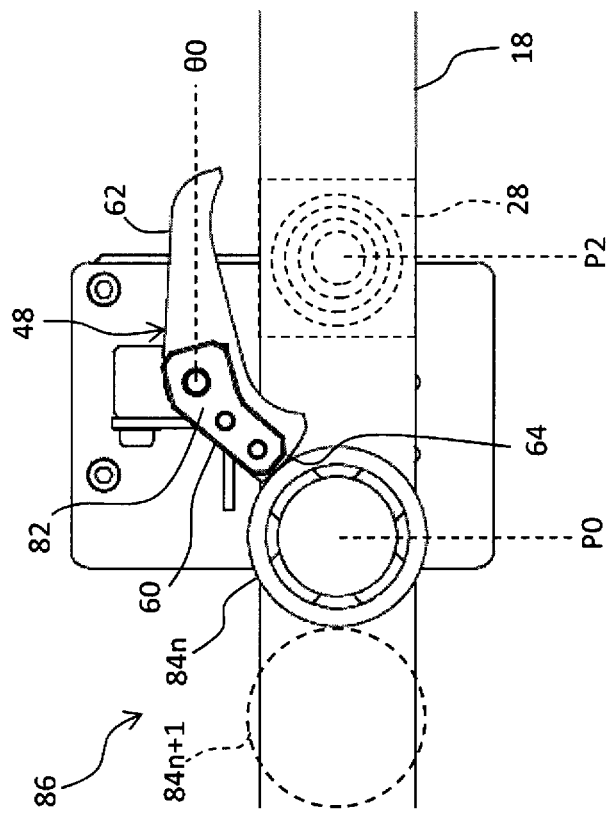
FIG. 6 is a view illustrating a first posture (original posture) of the movable piece.
Figure 7:
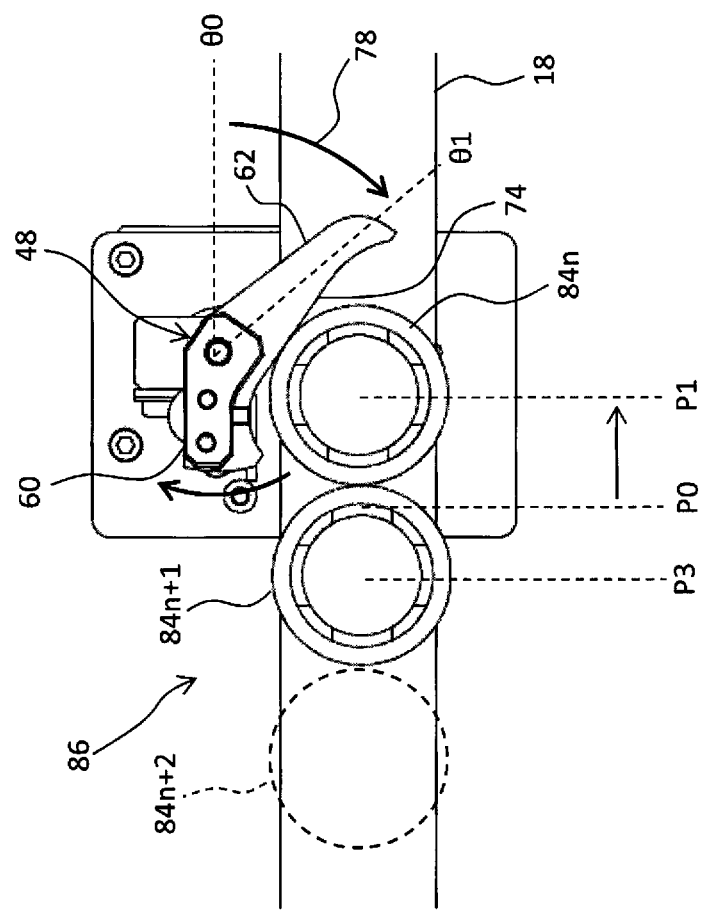
FIG. 7 is a view illustrating a second posture (receiving posture) of the movable piece.

Operations of the separation mechanism; that is, actions of the movable piece 48, will be specifically described with reference to FIGS. 6 to 10. FIG. 6 illustrates the first posture of the movable piece 48. FIG. 7 illustrates the second posture of the movable piece 48. FIG. 8 illustrates the intermediate posture of the movable piece 48. FIG. 9 illustrates the movable piece 48 returned to the first posture. FIG.

10 summarizes actions of the front arm and the rear arm. Although the first posture is assumed to be an original posture, and the angle corresponding to the first posture is expressed as θ0, these are for the sake of convenience.

In FIG. 6, the movable piece 48 has the first posture (refer to θ0). The rear arm 62 is retreated from the conveying path 18. The end portion of the front arm 60, in particular, the stopper edge 64, advances above the conveying path 18, and the stopper edge 64 restricts forward movement of a holder 84n (where n indicates the order of individual holders, and n=1, 2, 3, . . . ). That is, the holder 84n is stopped. The conveying path 18 applies a forward-moving force to the holders 84n and 84n+1 at all times, and therefore, in FIG. 6, the holders 84n and 84n+1 are in a slipping state. In the illustrated example, the holder 84n is a leading holder of a row of holders 86. The second holder is the holder 84n+1. Usually, after the leading holder 84n is stopped by the stopper edge 64, the subsequent holder 84n+1 flowing from upstream collides with the stopped leading holder 84n. Then, another subsequent holder flowing from upstream collides with the stopped holder 84n+1. Such collisions are repeated and form the row of holders 86. The row of holders extends. Depending on circumstances on the upstream side, a plurality of holders in contact with one another may flow and come.

A stop position for the leading holder 84n is indicated by P0. In the embodiment, a reference stop position P2 is the communication position, and the communication device 28 is provided in the vicinity of the communication position (specifically, directly under the upper belt). Although there is a temporary stop position between the stop position P0 and the reference stop position P2, it is omitted in FIG. 6. Reference numeral 82 indicates a metal fixture for mounting the movable piece 48 to the shaft member.

In FIG. 7, after rotating in the clockwise direction (refer to reference numeral 78), the movable piece 48 is in the second posture (refer to θ1). Specifically, the rear arm 62 advances above the conveying path 18, and the front arm 60 retreats from the conveying path 18. The stopping effect by the stopper edge disappears as the front arm 60 retreats, and forward movement of the row of holders 86 starting from the holder 84n is allowed. At this time, the holder 84n moves forward from the stop position P0. The holder 84n that has moved forward collides with the guide edge 74 that has advanced obliquely above the conveyance path 18. As a result, the forward movement of the holder 84n is restricted, and the holder 84n is in a slipping state. The subsequent holders 84n+1 and 84n+2 are also in the same state. The position where the holder 84n stops in this case is a temporary stop position P1. The distance from the stop position P0 to the stop position P1 is a temporary amount of movement of the holder 84n when the holder 84n is received. Subsequently, the movable piece rotates in the counterclockwise direction.

In FIG. 8, the movable piece 48 is in the intermediate posture (refer to θ2). The change from the second posture to the intermediate posture is indicated by reference numeral 79. In the illustrated state, the hook 76 of the rear arm 62 is above the conveying path 18, and the stopper edge 64 of the front arm 60 advances above the conveying path 18.

Specifically, in the process of changing from the second posture to the intermediate posture, the guide edge 74 of the rear arm 62 rotates in the counterclockwise direction, and its angle of inclination decreases gradually. The holder 84n is moved forward as it is guided or led by the guide edge 74. The rear arm 62 stops moving when the intermediate posture of the movable piece 48 is realized, and the hook 76 captures the holder 84n to restrict its forward movement. At this point, the holder 84n is positioned at the reference stop position P2. The amount of movement of the holder 84n at this time corresponds to the distance from the temporary stop position P1 to the reference stop position P2. The amount of movement is within the range of 1 to 6 cm, for example.

Meanwhile, in the process of changing from the second posture to the intermediate posture, the end portion of the front arm 60 advances above the conveying path 18. That is, the protruding portion 65 of the front arm 60 enters a V-shaped gap between the holder 84n and the holder 84n+1 that are in a connected state, and the stopper edge 64 hits the second holder 84n+1 to restrict its forward movement. As a result, the holder 84n+1 stops at the stop position P0. The amount of movement of the holder 84n+1 at this time corresponds to the distance from the stop position P3 to the stop position P0.

As described above, in the second process, the holder 84n, which is a separation target, is separated from the subsequent holder 84n+1. In other words, a certain space is inserted between them. While the holder 84n is separated from the subsequent holder 84n+1 and the like, communication is performed between the communication device and an RFID tag in the holder 84n. After the time necessary for communication elapses, the movable piece returns from the intermediate posture to the first posture as described below.

In FIG. 9, the movable piece 48 rotates in the counterclockwise direction (refer to reference numeral 80), and the first posture of the movable piece 48 is generated again (refer to θ0). In the middle of the rotation, the effect of capturing the holder 84n by the hook disappears, and forward movement of the holder 84n is allowed. This causes the holder 84n to flow from directly above the communication device 28 (the reference stop position) to the downstream side. Meanwhile, during rotation of the movable piece 48 in the counterclockwise direction (refer to reference numeral 80); namely, during the process of changing from the intermediate posture to the first posture, the effect of stopping the holder 84n+1 by the stopper edge 64 is maintained. As a result, the holder 84n+1 continues to be stopped at the stop position P0. In other words, the entire row of holders 86 including the holder 84n+1 and the subsequent holder 84n+2 continues to be stopped.

FIG. 10 summarizes the above actions. In a column 90, the changes in angle and posture of the movable piece are described. In a column 92, the changes in front arm action are described. In the column 92, the changes in rear arm action are described. In a column 96, other operations are described.

In S10, the first posture of the movable piece is realized. In this state, the front arm restricts forward movement of the row of holders starting from the nth holder. In S12, the movable piece rotates in the forward direction (clockwise direction), and in S14, the second posture of the movable piece is realized. In the process of reaching that state, the restriction of forward movement of the row of holders starting from the nth holder by the front arm disappears, and forward movement of the row of holders is allowed. Meanwhile, in this process, the rear arm advances above the conveying path and restricts forward movement of the row of holders starting from the nth holder. At this point, the nth holder temporarily stops at the temporary stop position.

In S16, the movable piece rotates in the reverse direction (counterclockwise direction). In this process, the end portion of the front arm enters between the nth holder and the n+1th holder to restrict forward movement of the n+1th holder. At the same time, as the rear arm retreats, forward movement of the nth holder is allowed. In S18, the movable piece stops rotating when the intermediate posture of the movable piece is realized. In this state, the rear arm acts to position the nth holder at the reference stop position. The subsequent n+1th holder is separated from the nth holder by a predetermined distance. In this state, communication to read or write information from/in the nth holder is performed.

In S20, the movable piece further rotates in the reverse direction (counterclockwise direction), and the first posture of the movable member is realized again. In this process, forward movement of the row of holders starting from the n+1th holder continues to be restricted by the front arm. Meanwhile, in this process, the restricting effect by the rear arm disappears, and forward movement of the nth holder is allowed. Then, the steps after S10 are performed repeatedly.

With the separation mechanism described above, it is possible to perform separation of a leading holder from a row of holders by means of a simple structure in which a movable piece (single plate) having a predetermined shape rotates horizontally. The separation mechanism only needs to provide a vertical rotational shaft or the like in the vicinity of the conveying path as a mechanism for causing the movable piece to rotate horizontally, and therefore, it is possible to obtain the advantage of no need to provide large equipment around the movable piece as a mechanism for causing the movable piece to operate. It is also possible to install the drive source in an underground space below the conveying path, and in this case, the dead space can be used effectively.

(3) Branching Mechanism and Transport Mechanism

Next, a branching mechanism and a transport mechanism installed together with the above separation mechanism will be described. As a matter of course, any one or two of the separation mechanism, the branching mechanism, and the transport mechanism may be incorporated into the holder conveying apparatus.

Figure 11:
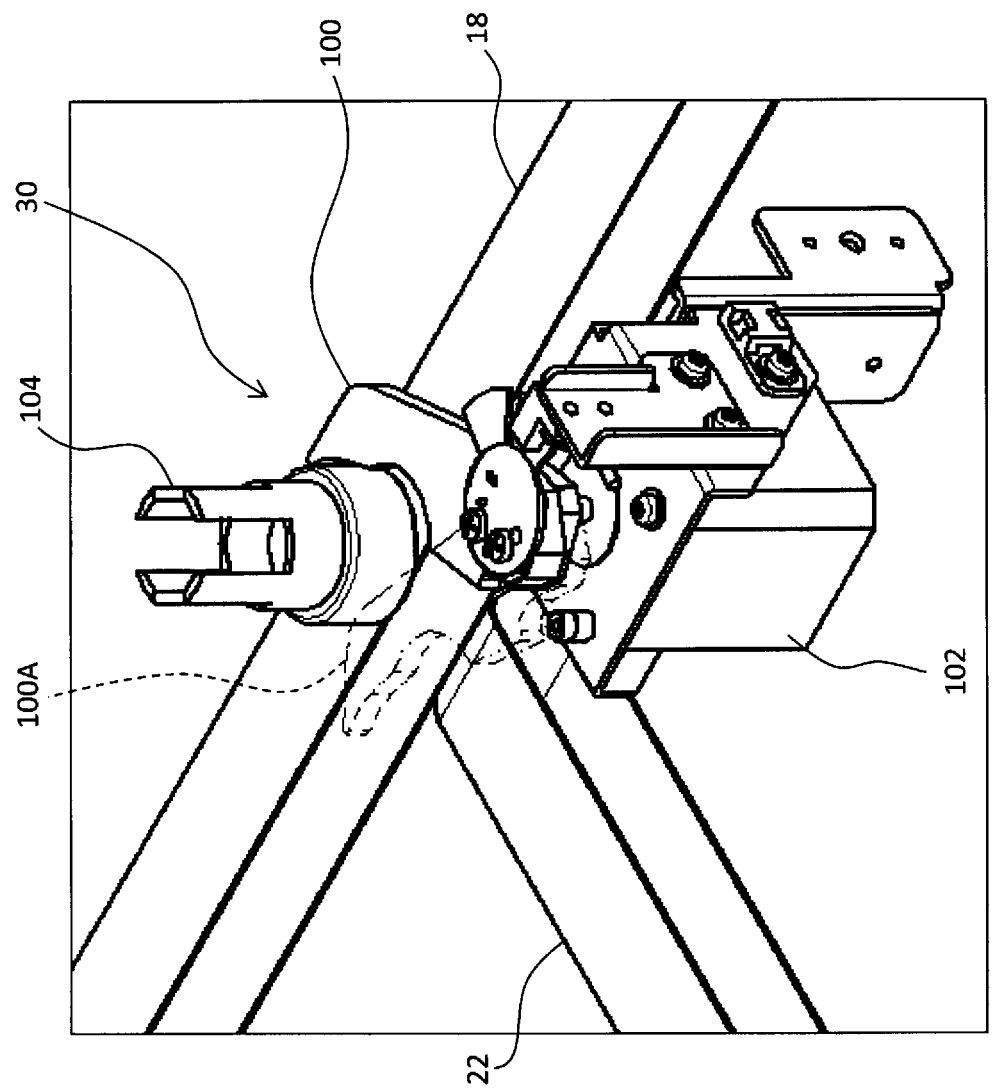
FIG. 11 is a perspective view illustrating a branching mechanism.

FIG. 11 illustrates a configuration example of the branching mechanism. The illustrated branching mechanism 30 is a mechanism for feeding a holder (target holder) 104 from the conveying path 18 to the conveying path 22. The branching mechanism 30 has, for example, a feed arm 100 and a motor 102 serving as a drive source. The feed arm 100 is a member that rotates around a vertical rotational shaft horizontally. Reference numeral 100A indicates the feed arm after rotation.

Figure 14:
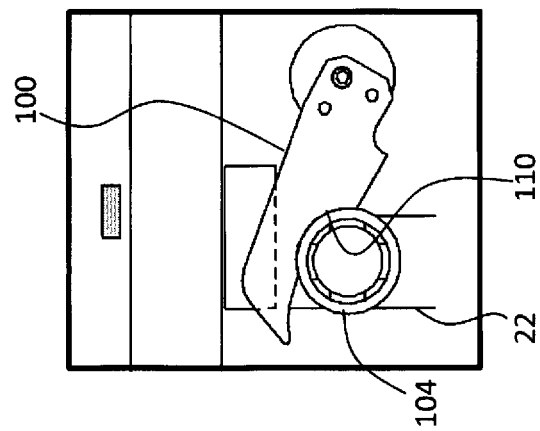
FIG. 14 is a view illustrating the branching mechanism feeding the holder
Figure 13:
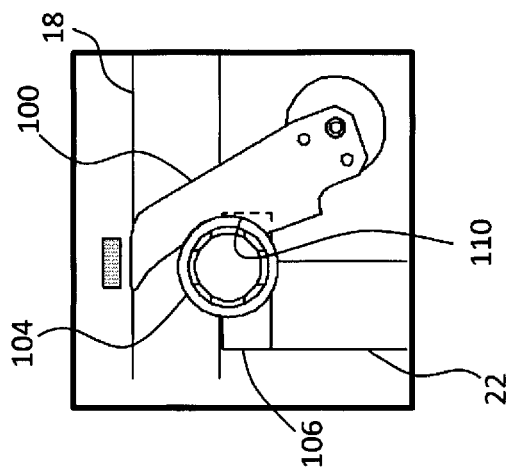
FIG. 13 is a view illustrating the branching mechanism capturing the holder.
Figure 12:
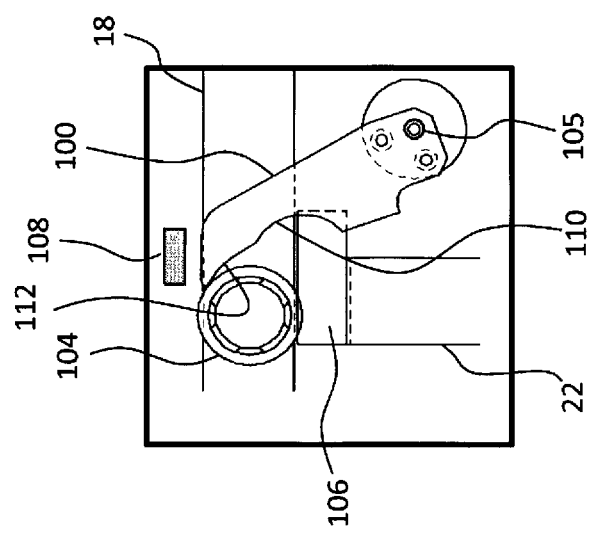
FIG. 12 is a view illustrating the branching mechanism leading a holder therein.

FIGS. 12 to 14 illustrate operations of the branching mechanism; that is, operations of the feed arm 100. In FIG. 12, the feed arm 100 advances above the conveying path 18, and specifically it obliquely crosses the conveying path 18. This state is detected by a sensor 108 if necessary. The feed arm 100 has a hook 112 having a warped shape and an arc-shaped recess 110. Reference numeral 105 indicates a rotational shaft. Reference numeral 106 indicates a relay pedestal provided between the conveying path 18 and the conveying path 22.

As shown in FIG. 12, the target holder 104 that has moved on the conveying path 18 hits the hook 112. Then, the hook 112 guides the target holder 104 toward the rotational shaft 105. The target holder 104 is thus received in the recess 110, as shown in FIG. 13. That is, the target holder 104 is captured by the recess 110. In this state, a portion of the target holder 104 is on the conveying path 18, and the remaining portion is on the relay pedestal 106. Next, as shown in FIG. 14, the feed arm 100 rotates in the counter-clockwise direction. Although, at this time, a centrifugal force or a similar force is applied to the target holder 104, the recess 110 continues to capture the target holder 104. Then, the target holder 104 is conveyed by the conveying path 22.

Figure 15:
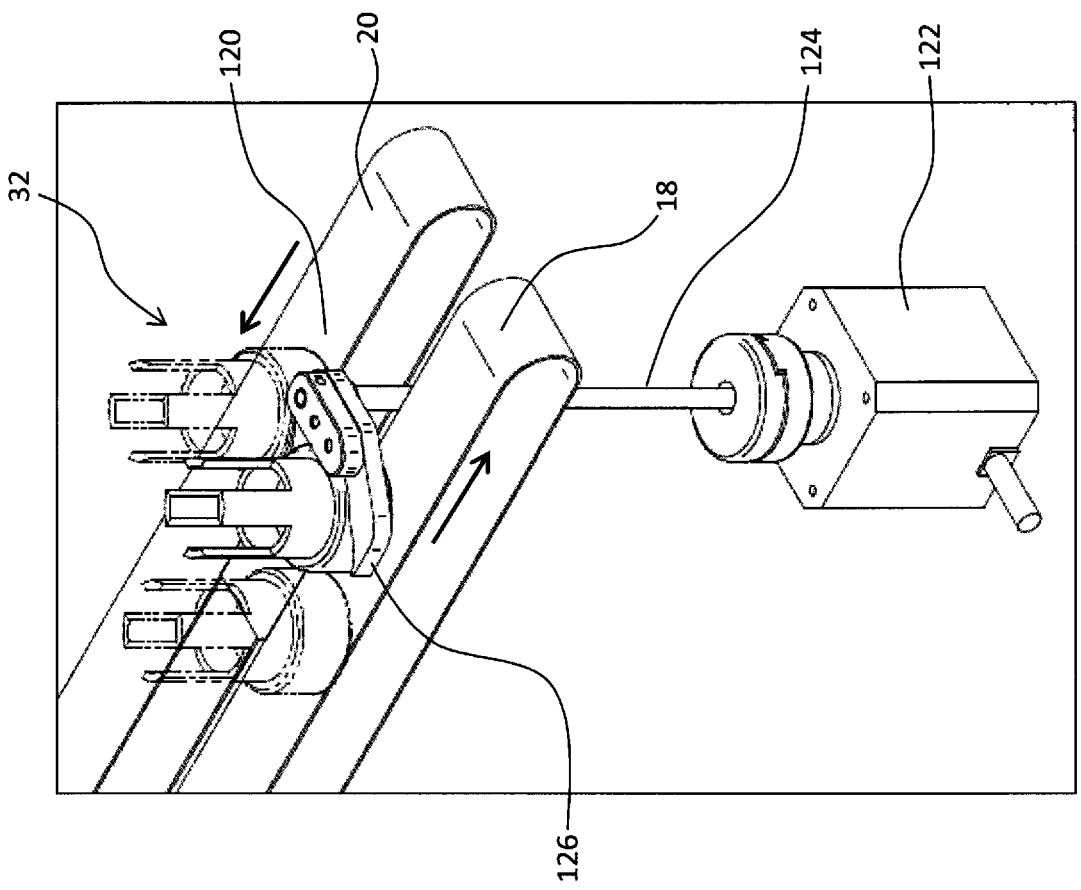
FIG. 15 is a perspective view illustrating a transport mechanism.

FIG. 15 illustrates an example configuration of the transport mechanism. The illustrated transport mechanism 32 has a feed mechanism 120 having a feed arm 126, a motor 122 serving as a drive source, and a shaft member 124. The shaft member 124 passes through the gap between the conveying path 18 and the conveying path 20 along the vertical direction. The feed arm 126 is fixed to an upper end portion of the shaft member 124. A rotational driving force of the motor 122 is transmitted to the feed arm 126 via the shaft member 124.

Figure 16:
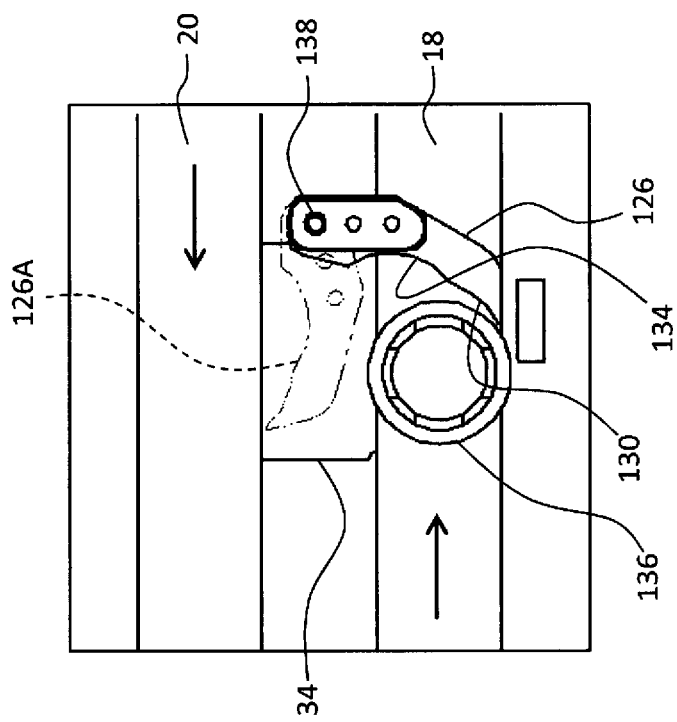
FIG. 16 is a view illustrating operations of the transport mechanism.

Operations of the transport mechanism, that is, actions of the feed arm 126 will be described with reference to FIG. 16. In FIG. 16, the feed arm 126 advances above the conveying path 18; specifically, it obliquely crosses the conveying path 18. This state may be detected by the sensor. The feed arm 126 has a hook having a warped shape and a curved recess 134. In FIG. 16, a target holder 136 is a target to be transported from the conveying path 18 to the conveying path 20.

In the state illustrated in FIG. 16, a hook 130 acts to lead the target holder 136 toward the rotational shaft 138. The target holder 136 is then captured by the recess 134. Then, when the feed arm 126 rotates in the clockwise direction, the target holder 136 captured by the recess 134 is fed onto the relay pedestal 34 and further fed onto the conveying path 20 (refer to reference numeral 126A).

Both of the branching mechanism and the transport mechanism described above feed a holder in a desired direction by means of a single member that rotates horizontally. Accordingly, the feeding can be realized by means of a simple mechanism. In particular, it is possible to obtain the advantages of easy installation of the drive source below the conveying paths and no need to provide a complicated mechanism around the member that feeds the holder.

(4) Second Example of Separation Mechanism

Next, a second example of the separation mechanism will be described with reference to FIGS. 17 to 21. In this second example again, a single movable member is used to separate holders, as in the above first example. Specifically, a movable plate 142 described below is used.

Figure 17:
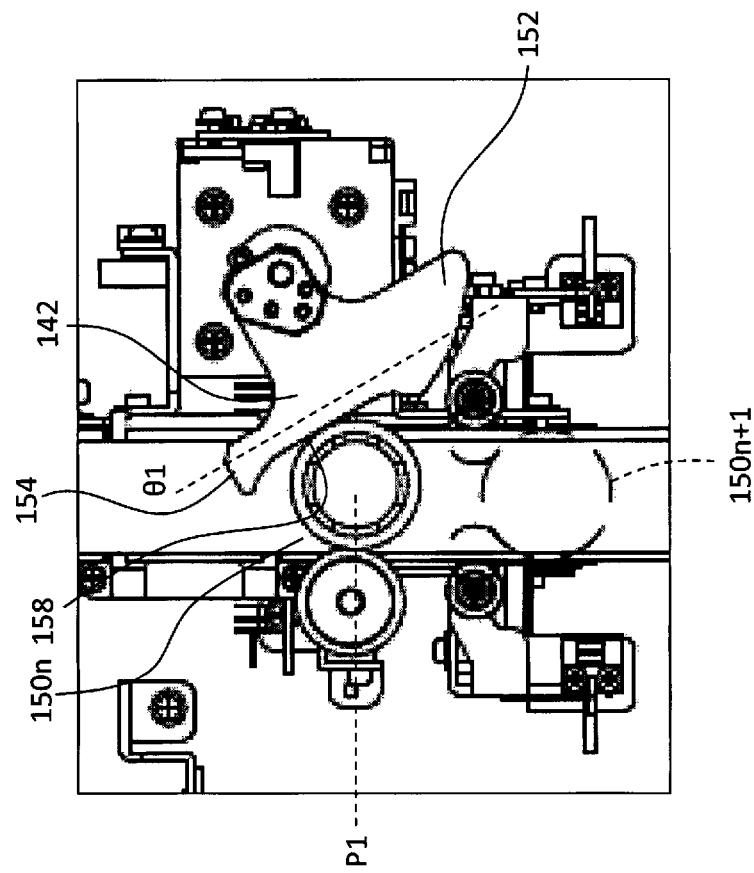
FIG. 17 is a view illustrating a first posture of a movable plate in a second example of the separation mechanism.
Figure 18:
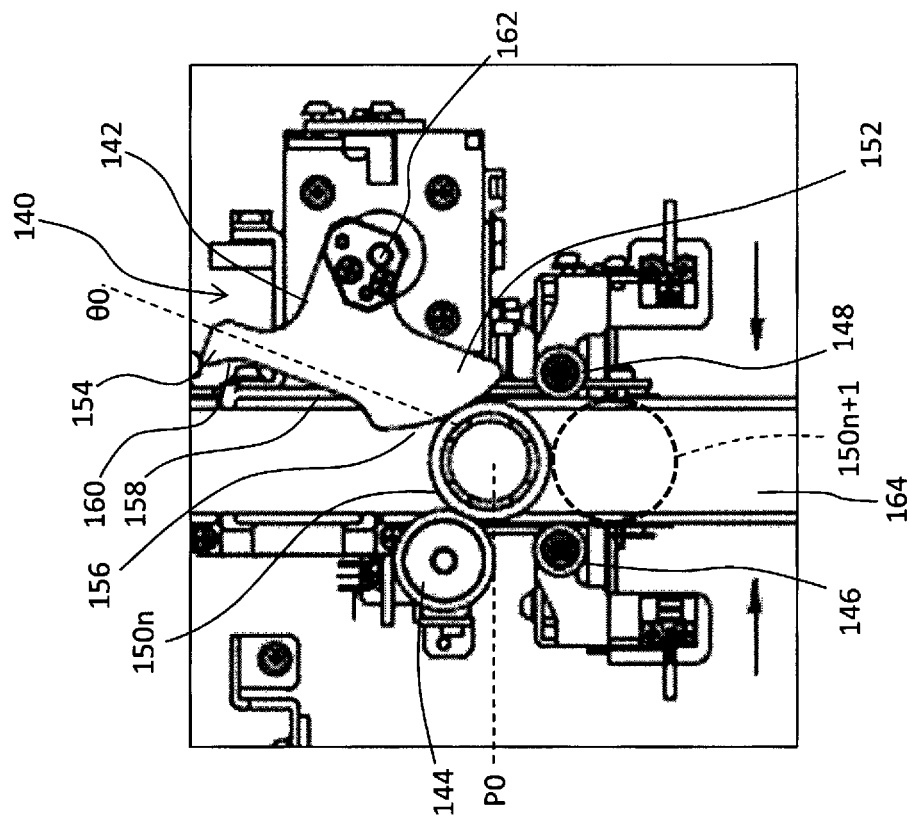
FIG. 18 is a view illustrating a second posture (receiving posture) of the movable plate in the second example of the separation mechanism.
Figure 19:
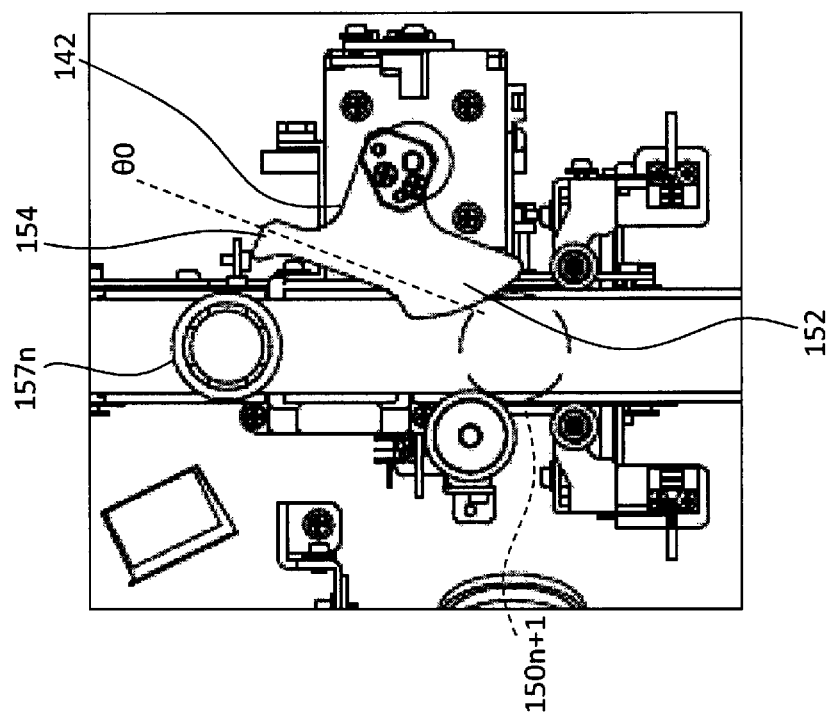
FIG. 19 is a view illustrating an intermediate posture (positioning posture) of the movable plate in the second example of the separation mechanism.
Figure 20:
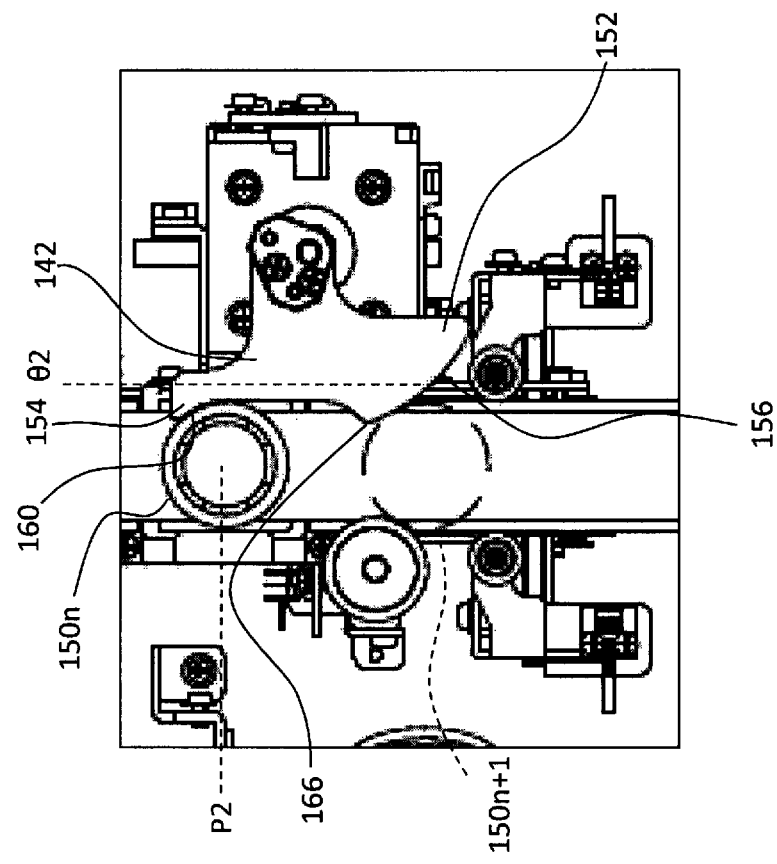
FIG. 20 is a view illustrating the movable plate returned to the first posture in the second example of the separation mechanism.

FIG. 17 illustrates a first posture of the movable plate 142 in a separation mechanism 140. FIG. 18 illustrates a second posture of the movable plate 142. FIG. 19 illustrates an intermediate posture of the movable plate 142. FIG. 20 illustrates the movable plate 142 returned to the first posture.

In the state illustrated in FIG. 17, the first posture of the movable plate 142 is realized (refer to θ0). As described below, in this first posture, for example, rotation, reading, and imaging may be performed on a leading holder 150$n$.

A conveying path 164 conveys holders 150$n$ and 150$n$+1 from the lower side to the upper side in FIG. 17. The conveying path 164 is composed of a belt conveyor. A rotational shaft 162 is provided, on one side of the conveying path 164, in the vicinity of the conveying path 164, and the movable plate 142 is fixed to an upper end portion of the rotational shaft 162. The rotational shaft 162 is composed of a shaft member that is driven to rotate by a motor which is a drive source. The motor is installed at a position below the conveying path 164.

The movable plate 142 has a front arm 152 and a rear arm 154. In the first posture, the front arm 152 protrudes or expands to the upstream side of the conveying path 164, and the rear arm 154 protrudes or expands to the downstream side of the conveying path 164. The front arm 152 has an arc-shaped stopper edge 156. The radius of curvature of the stopper edge 156 may be constant when viewed from the rotational shaft 162. The rear arm 154 has a linear guide edge 158 and a hook 160 having a warped shape. In the first posture, a portion of the stopper edge 156 advances above the conveying path 164.

In addition, in the state illustrated in FIG. 17, a rotation drive roller 144 and the stopper edge 156 restrict forward movement of the holder 150n. At this time, the holder 150n is at a position P0 and is in a slipping state. While the front side of the holder 150n is in contact with the rotation drive roller 144 and the stopper edge 156, two pressing rollers 146 and 148 move to the rear side of the holder 150n and hit the rear side of the holder 150n. As a result, the holder 150n is in a restricted (clamped) state. When the rotation drive roller 144 rotates while the holder 150n is in the restricted state, a rotational force is applied to the holder 150n. That is, the holder 150n is rotated. During this rotation process, a barcode adhered to a sample container held by the holder 150n is read. A barcode adhered to the holder 150n may be read. During the rotation process or before and after the rotation, the sample container held by the holder 150n is imaged if necessary. At this time, the presence of a cap on the sample container, the type of the cap, and the like may also be determined by means of an optical sensor or the like. In this second example, when the two pressing roller 146 and 148 form the clamped state of the holder 150n, two rollers (not illustrated) hold the subsequent holder 150n+1 and restrict its forward movement. After completion of the above series of examinations, the movable plate 142 rotates in the counterclockwise direction, and thus, the second posture of the movable plate 142 is realized.

FIG. 18 illustrates the second posture of the movable plate 142 (refer to θ1). Specifically, the front arm 152 retreats from above the conveying path, and the rear arm 154 advances above the conveying path. Restriction of forward movement of the holder 150n by the front arm 152 disappears as the front arm 152 retreats, and the holder 150n moves forward. At this time, the holder 150n+1 continues to be held at a standby position, and therefore, the holder 150n is separated from the subsequent row of holders. Meanwhile, the guide edge 158 of the rear arm 154 obliquely crosses the conveying path, and thus, the holder 150n that has moved forward collides with the guide edge 158. As a result, the holder 150n stops at a temporary stop position P1. Then, the movable plate 142 rotates in the clockwise direction and realizes its intermediate state.

FIG. 19 illustrates the intermediate state. That is, it illustrates an intermediate posture of the movable plate 142 (refer to θ2). In the process of changing from the second posture to the intermediate posture, a portion 166 of the front arm 152 enters the rear side of the holder 150n. In addition, in the process of changing from the second posture to the intermediate posture, the holder n+1 is released, and its forward movement is allowed. The holder n+1 hits the stopper edge 156 of the movable plate 142, which is in the intermediate posture, and forward movement of the holder n+1 is restricted. Meanwhile, in the above process, as the rear arm 154 retreats, the guide edge changes its posture from an inclined posture to a parallel posture with respect to the conveying path to thereby allow forward movement of the holder 150n. Then, the hook 160 captures the holder 150n at a reference stop position P2 and restricts its forward movement. In this state, communication is performed between an RFID tag in the holder 150n and a communication device. After the communication is completed, the movable plate 142 rotates in the clockwise direction. As a result, the first posture of the movable plate 142 is realized again.

FIG. 20 illustrates the first posture of the movable plate 142 (refer to θ0). In the process of changing from the intermediate posture to the first posture, restriction of forward movement of the holder 150n by the rear arm 154 is released, and forward movement of the holder 150n is allowed. During this process, the front arm 152 continues to restrict forward movement of the holder 150n+1.

Figure 21:
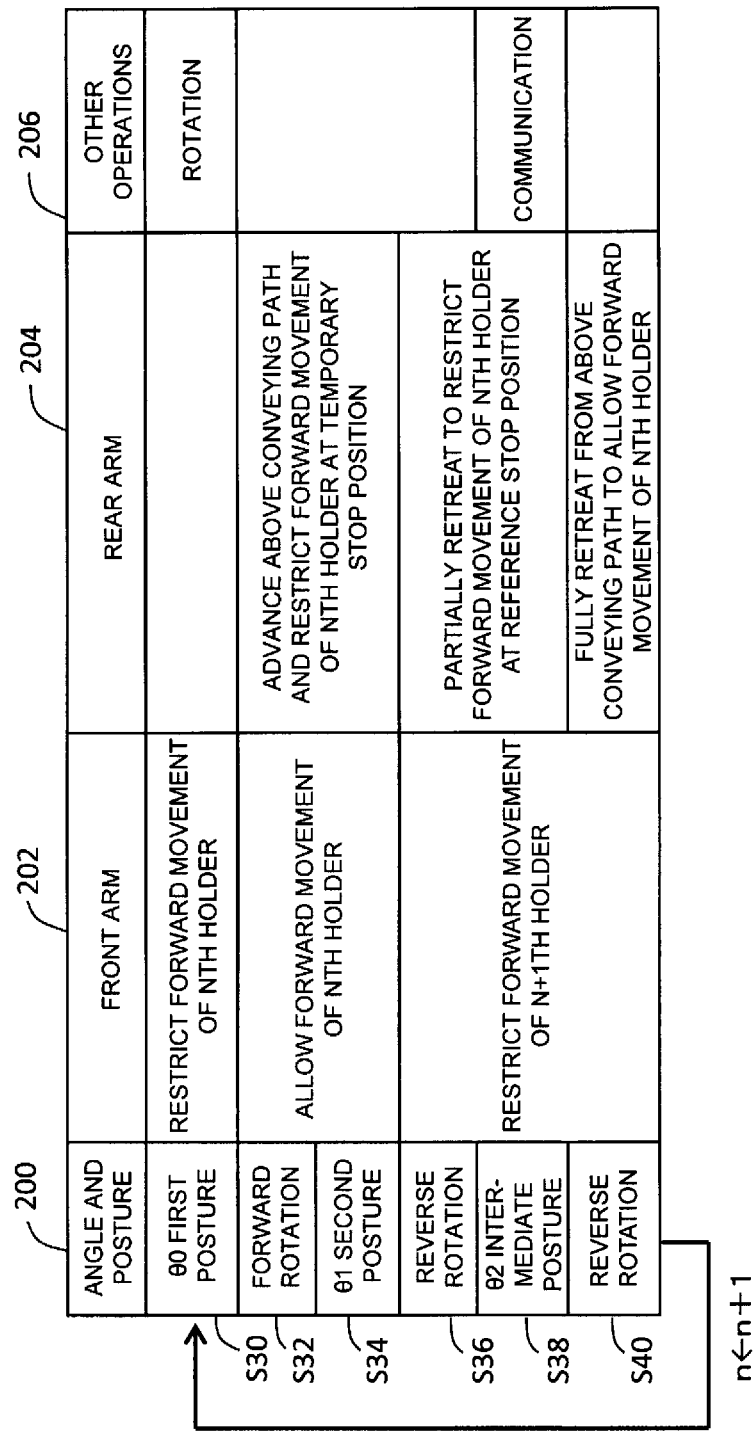
FIG. 21 is a diagram for describing actions of the front arm and the rear arm in the second example of the separation mechanism.

FIG. 21 summarizes the operations of the branching mechanism according to the second example. In a column 200, the changes in angle and posture of the movable plate are described. In a column 202, the changes in front arm action are described. In a column 204, the changes in rear arm action are described. In a column 206, other operations are described.

In S30, the first posture of the movable plate is realized. At this time, the front arm restricts forward movement of the row of holders starting from the nth holder. In addition, in S30, the nth holder is clamped and then driven to rotate. At this time, the n+1th holder is held. In S32, the movable plate rotates in the counter clockwise direction. In this process, restriction of forward movement of the nth holder by the front arm is released, and the nth holder moves forward. Meanwhile, in this process, the rear arm stops the nth holder that has moved forward at the temporary stop position. In S34, the second posture of the movable plate is realized.

Next, in S36, the movable plate rotates in the clockwise direction. In this process, a portion of the front arm enters the rear side of the nth holder. In this process, the rear arm allows forward movement of the nth holder, and when the nth holder reaches the reference stop position, its forward movement is restricted. In S38, the intermediate posture of the movable plate is realized. Communication is performed in this state. In the process of realizing the intermediate posture, the n+1th holder is released, and its forward movement is restricted by the stopper edge of the movable plate.

In S40, the movable plate rotates in the clockwise direction. As a result, the first posture is realized again.

In this second example of the separation mechanism again, as in the first example, it is possible to separate the leading holder from the row of holders and position the separated leading holder at the reference stop position. It is also possible to obtain the advantages of easy installation of the drive source below the conveying path and no need to provide a complicated mechanism around the movable member.

(5) Variants

Although, in the first example and the second example of the separation mechanism, the drive source has been installed below the conveying path, it may be installed above the conveying mechanism. Further, the shape of the movable member may be changed as long as the actions by the arms described above can be achieved. For example, the length or the shape of each of the arms may be changed. The movable member may be formed into a circular plate or rectangular plate having a predetermined edge. It is also possible to form the front arm and the rear arm as separate members. Alternatively, the arms may be exchangeable.

Although, in the first example and the second example of the separation mechanism, the nth holder has been temporarily stopped at the temporary stop position, it is also possible to cause the front arm to hit the n+1th holder without stopping the nth holder temporarily.

Figure 22:
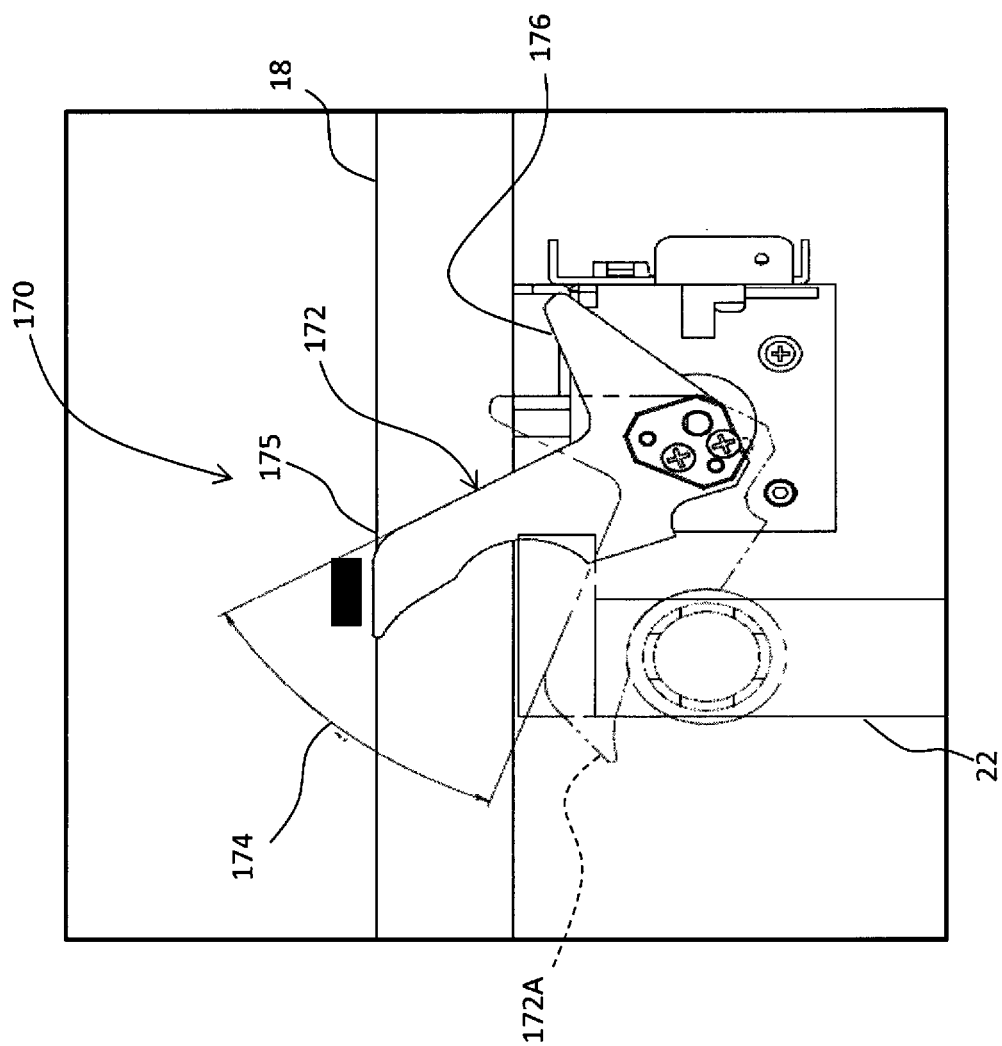
FIG. 22 is a view illustrating another branching mechanism.

FIG. 22 illustrates a variant of the branching mechanism. A branching mechanism 170 is a mechanism for feeding a holder from the conveying path 18 to the conveying path 22. A feed arm 172 is a member responsible for that function. The feed arm 172 is composed of a body 175 and a protruding portion 176. The body 175 has a shape similar to that of the feed arm 100 illustrated in FIG. 11 and elsewhere. Like the body 175, the protruding portion 176 rotates around the rotational shaft, and it functions as, for example, a member that temporarily stops holders linearly passing through on the conveying path 18. The rotated state of the feed arm 172 is indicated by reference numeral 172A. The range of rotation is indicated by reference numeral 174.

(6) Summary of Disclosure

A holder conveying apparatus according to an embodiment includes a conveying path that applies a forward-moving force to a plurality of holders conveying a plurality of sample containers individually, and a separation mechanism that has a movable member rotating about a vertical rotational shaft set in the vicinity of the conveying path. Rotation of the movable member in one direction realizes a first posture of the movable member, and rotation of the movable member in the other direction realizes a second posture of the movable member. The movable member has a front arm and a rear arm. In a first process of changing from the first posture to the second posture, the front arm retreats from above the conveying path to allow forward movement of an nth holder, and, in a second process of changing from the second posture to the first posture, the front arm advances above the conveying path to restrict forward movement of an n+1th holder. The rear arm is an arm provided on the downstream side of the front arm. In the first process, the rear arm advances above the conveying path to restrict forward movement of the nth holder, and in the second process, it retreats from above the conveying path to allow forward movement of the nth holder.

With the above structure, rotation of the movable member in one direction and rotation of the movable member in the other direction separates the nth holder (leading holder) from the n+1th holder (subsequent holder). That is, in the first process, after the front arm allows forward movement of the nth holder, the rear arm restricts forward movement of the nth holder. In other words, the nth holder is handed over from the front arm to the rear arm. Then, when the rear arm retreats, a portion of the front arm enters between the nth holder and the n+1th holder, and the front arm restricts forward movement of the n+1th holder. As a result, the nth holder is separated from the n+1th holder. That is, the leading holder is separated from the row of holders. The row of holders is usually composed of one or more subsequent holders. There may occur a situation where no subsequent holder is present in the separation section.

In the above structure, the rotational shaft is provided as a vertical shaft in the vicinity of the conveying path. The rotational shaft is perpendicular to the conveying path. If the rotational shaft is provided in the separation section such that the two arms of the movable member can perform their actions, the position of the rotational shaft satisfies the conditions of the vicinity. Accordingly, the rotational shaft may be provided just near the conveying path or may be provided at a position slightly away from the conveying path, as long as the two arms can perform their actions. n is 1, 2, 3, .... The conveying path described above is generally composed of a member such as a belt that applies a forward-moving force to a plurality of holders, and more accurately, is generally composed of that member, and a belt-shaped portion on which the plurality of holders may be placed or present. If the arm advances above the belt-shaped portion, the holder comes in contact with the arm, and if the arm retreats from above the belt-shaped portion, restriction by the arm is released.

In the embodiment, the intermediate posture of the movable member is realized in the middle of the second process, and, in the process of changing from the second posture to the intermediate posture, the front arm restricts forward movement of the n+1th holder, and the rear arm allows forward movement of the nth holder to a reference stop position.

With this structure, the separated nth holder is positioned at the reference stop position in the middle of the second process. For example, communication, barcode reading, and the like are performed on the nth holder temporarily stopped at the reference stop position. In the embodiment, a communication device for communicating with the nth holder is provided in the vicinity of the reference stop position. Here, the vicinity is a concept that includes a location, for example, just under or beside the nth holder temporarily stopped at the reference stop position, and if the communication device is in a positional relationship with the nth holder that allows appropriate communication between them, the conditions of the vicinity are satisfied.

Preferably, a non-contact communication device that communicates with an RFID tag, including, for example, a reader, a writer, and a reader/writer, is provided as the communication device. Communication can be performed on the nth holder which is separated from the subsequent holders and present as an isolated unit and therefore, it is possible to obtain the advantages of, for example, enabling limitation of communication targets and increased communication efficiency. Although it is preferable to perform communication while the holder is temporarily stopped, it is also possible to perform communication while the holder is moving.

In the embodiment, the rear arm has a guide edge that abuts against the nth holder when the nth holder moves forward from a temporary stop position to the reference stop position, and a hook that restricts, at the reference stop position, forward movement of the nth holder when the movable member is in the intermediate posture. While the holder moves from the temporary stop position to the reference stop position, the guide edge continues to contact the holder. That is, the guide edge performs the function of guiding or leading forward movement of the holder. The separated state is realized in this process. When the movable member is in the intermediate posture, the hook protrudes above the conveying path, and the hook restricts forward movement of the nth holder. That is, it captures the nth holder. By providing the temporary stop position, it becomes easy to separate the nth holder from the n+1th holder, or it becomes possible to reduce the impact on the n+1th holder. If the separation can be performed reliably, and if the impact on the n+1 holder is not a problem, it is also possible to allow the nth holder to move forward without temporarily stopping it and cause the front arm to stop the n+1th holder and the subsequent holders.

The interval between the nth holder and the n+1th holder that are separated may be changed by allowing the length of the front arm and the length of the rear arm to be changed. The shapes of the individual arms; that is, the shape of the movable member, has a degree of freedom as long as the above functions can be performed. That is, it is not always necessary to adopt a shape like a human arm or an elongated shape as the shape of the arms.

In the embodiment, the front arm has a stopper edge that, in the process of changing from the second posture to the intermediate posture, hits the n+1th holder to restrict forward movement of the n+1th holder. An arc-shaped edge with a constant radius from the center of rotation may be adopted as the stopper edge. With this structure, it is possible to immobilize the holder stop position during rotation of the movable member.

In the embodiment, the holder conveying apparatus has a drive source that is provided at a position lower than the conveying path and a shaft member that constitutes a rotational shaft and transmits to the movable member a rotational driving force generated in the drive source. With this structure, it is possible to use a space generated below the conveying path effectively.

In the embodiment, the holder conveying apparatus includes a rotational drive member that applies a rotary motion force to the nth holder while forward movement of the nth holder is restricted. For example, when the barcode adhered to the sample container held by the nth holder is read, the rotational drive member applies the rotational driving force to the nth holder.

In the embodiment, the holder conveying apparatus includes a branching mechanism provided at a branch point on the conveying path, and the branching mechanism includes a feed arm that advances above the conveying path, captures a target holder, and feeds the target holder to a branch conveying path. Preferably, a separation point is set in front of the branch point. That is, the separation mechanism is provided just in front of the branching mechanism.

In the embodiment, the holder conveying apparatus includes a transport mechanism provided at a transport point on the conveying path, and the transport mechanism includes a feed arm that advances above the conveying path, captures a target holder, and feeds the target holder to another conveying path. Preferably, each of the separation mechanism, the branching mechanism, and the transport mechanism has a member that moves horizontally (movable member, feed arm, or the like). With this structure, it is possible to install the drive sources of the mechanisms below the level where the conveying path is provided.

The invention claimed is:

1. A holder conveying apparatus comprising:
    a conveying path configured to apply a forward-moving force to a plurality of holders conveying a plurality of sample containers individually; and
    a separation mechanism that has a movable member rotating about a vertical rotational shaft set in the vicinity of the conveying path, wherein rotation of the movable member in one direction is configured to realize a first posture of the movable member, and rotation of the movable member in the other direction is configured to realize a second posture of the movable member, the movable member comprises a front arm that, in a first process of changing from the first posture to the second posture, is configured to retreat from above the conveying path to allow forward movement of an nth holder, and, in a second process of changing from the second posture to the first posture, is configured to advance above the conveying path to restrict forward movement of an n+1 th holder, and
    a rear arm that is an arm provided on the downstream side of the front arm, and, in the first process, is configured to advance above the conveying path to restrict forward movement of the nth holder and, in the second process, is configured to retreat from above the conveying path to allow forward movement of the nth holder, and
    wherein in the middle of the second process, an intermediate posture of the movable member is realized, and in a process of changing from the second posture to the intermediate posture, the front arm is configured to restrict forward movement of the n+1 th holder, and the rear arm is configured to allow forward movement of the nth holder to a reference stop position.

2. The holder conveying apparatus according to claim 1, wherein a communication device that communicates with the nth holder is provided at the reference stop position or in the vicinity of the reference stop position.

3. The holder conveying apparatus according to claim 1, wherein when the movable member is in the second posture, the rear arm stops the nth holder at a temporary stop position, and the rear arm has a guide edge that abuts against the nth holder when the nth holder moves forward from the temporary stop position to the reference stop position, and a hook that restricts, at the reference stop position, forward movement of the nth holder when the movable member is in the intermediate posture.

4. The holder conveying apparatus according to claim 1, wherein the front arm has a stopper edge that, in the process of changing from the second posture to the intermediate posture, is configured to hit the n+1 th holder to restrict forward movement of the n+1 th holder.

5. The holder conveying apparatus according to claim 1, further comprising:
    a drive source provided at a position lower than the conveying path, and
    a shaft member that constitutes the rotational shaft and transmits to the movable member a rotational driving force generated in the drive source.

6. The holder conveying apparatus according to claim 1, further comprising a rotational drive member that applies a rotary motion force to the nth holder while forward movement of the nth holder is restricted.

7. The holder conveying apparatus according to claim 1, further comprising a branching mechanism provided at a branch point on the conveying path, wherein the branching mechanism includes a feed arm that advances above the conveying path, captures a target holder, and feeds the target holder to a branch conveying path.

8. The holder conveying apparatus according to claim 1, further comprising a transport mechanism provided at a transport point on the conveying path, wherein the transport mechanism includes a feed arm that advances above the conveying path, captures a target holder, and feeds the target holder to another conveying path.

* * * * *